United States Patent
Haake

(10) Patent No.: US 9,975,467 B1
(45) Date of Patent: May 22, 2018

(54) CARGO TIE-DOWN

(71) Applicant: Shannon I. Haake, Eagle, NE (US)

(72) Inventor: Shannon I. Haake, Eagle, NE (US)

( * ) Notice: Subject to any disclaimer, the term of this patent is extended or adjusted under 35 U.S.C. 154(b) by 0 days. days.

(21) Appl. No.: 15/703,520

(22) Filed: Sep. 13, 2017

Related U.S. Application Data

(63) Continuation-in-part of application No. 62/393,887, filed on Sep. 13, 2016.

(51) Int. Cl.
*B60P 7/08* (2006.01)
*B60P 7/13* (2006.01)

(52) U.S. Cl.
CPC .............. *B60P 7/0807* (2013.01); *B60P 7/13* (2013.01)

(58) Field of Classification Search
CPC ......... B60P 7/0807; B60P 7/13; B60P 7/0838; B60R 2011/0084
USPC ........... 410/12, 85, 97, 100, 116; 211/105.3; 74/167, 168
See application file for complete search history.

(56) References Cited

U.S. PATENT DOCUMENTS

| 2,784,938 | A | | 3/1957 | Huber |
| 4,155,537 | A | | 5/1979 | Bronson et al. |
| 4,732,516 | A | * | 3/1988 | Borchardt ............... B63B 25/28 |
| | | | | 410/77 |
| 4,842,236 | A | | 6/1989 | Yonts |
| 5,673,464 | A | | 10/1997 | Whitaker |
| 6,065,914 | A | * | 5/2000 | Fotou ...................... B60P 3/079 |
| | | | | 410/100 |
| 6,789,384 | B2 | | 9/2004 | Hungerford |
| 7,464,916 | B1 | | 12/2008 | Drinkhorn |
| 2011/0064535 | A1 | | 3/2011 | Tardif et al. |
| 2013/0017031 | A1 | * | 1/2013 | Xiao ........................ B60P 7/15 |
| | | | | 410/151 |
| 2014/0182084 | A1 | | 7/2014 | Hill |

\* cited by examiner

*Primary Examiner* — Stephen Gordon
(74) *Attorney, Agent, or Firm* — Aaron R. Cramer; Cramer Patent + Design PLLC

(57) ABSTRACT

A cargo securing apparatus utilizes a durable first member and a pair of stainless steel hooks. The first member is retractably secured within an outer member having a pair of locking handles on the exterior. Secured to the outer member is a first hook. Secured to the inner member opposite the first hook is at least one (1) second hook.

20 Claims, 5 Drawing Sheets

CARGO TIE-DOWN

RELATED APPLICATIONS

The present invention is a continuation-in-part of and claims the benefit of U.S. Provisional Application No. 62/393,887 filed on Sep. 13, 2016, the entire disclosures of which are incorporated herein by reference.

FIELD OF THE INVENTION

The present invention relates generally to the field of tie-downs and more specifically relates to a cargo restraint.

BACKGROUND OF THE INVENTION

Cargo restraints of many kinds have been used to tie cargo onto freight carriers such as trucks, trailers, trains, planes and ships to prevent the load from shifting or moving while being transported. In the past, load binders have generally been of the ratchet type or the cam lever type. In the ratchet type binder, the ability to tightly bind is relatively slow. In the case of the cam lever type, they may be applied quickly with a high degree of tightness but they have a very limited travel and are prone to come loose and release the load and may be dangerous to use.

Another commonly used type tie-down which is permanently affixed to a trailer is made of a support, a belt axis, and a binding strap. The belt axis is connected to the support and rotatable. In order for the cargo to be bound, a crowbar is inserted into a crowbar hole to turn the belt axis, thereby furling the binding strap, in which case the cargo can be tightly bound. However, since the tie-down is fixed on the vehicle body and restricted to a certain position, the crowbar should be pulled out and inserted into another crowbar hole after the belt axis is driven to rotate by a certain angle through turning the crowbar during operation, and thus the belt axis could continue to rotate. This process is very time consuming and has inherent risk of injury to the operator should the crowbar slip.

Various attempts have been made to solve problems found in the cargo restraint art. Among these are found in: U.S. Pat. Nos. 6,789,384; 4,617,703; and 7,334,955. These prior art references are representative of cargo restraints.

None of the above inventions and patents, taken either singly or in combination, is seen to describe the invention as claimed. Thus, a need exists for a reliable cargo restraint device, and to avoid the above-mentioned problems.

SUMMARY OF THE INVENTION

In view of the foregoing references, the inventor recognized the aforementioned inherent problems and observed that there is a need for a means to provide a quickly manipulatable and adjustable cargo tie-down tool for vehicles. Such a tool would be available with an outer member fully receiving an inner member. The outer member has a hook at a first end and the inner member has a hook at the second end. A first handle has a first gear that interacts with a first rack gear on a first side of the inner member. Similarly, a second handle has a second gear that interacts with a second rack gear on a second side of the inner member. The first and second handles are capable of being locked to restrict movement of the inner member relative to the outer member.

To achieve the above objectives, it is an object of the present invention to further include a first extension, where the first handle passes through. The first extension is on the first side of the outer member and corresponds to the first side of the inner member, such that the first gear of the first handle interacts with the first rack gear of the inner member. A first locking mechanism, which includes a first key lock that operably controls a first plunger interacts with the first gear, thereby restricting movement thereof. Similarly, the second extension is on the second side of the outer member and corresponds to the second side of the inner member, such that the second gear of the second handle interacts with the second rack gear of the inner member. A second locking mechanism, which includes a second key lock that operably controls a second plunger interacts with the second gear, thereby restricting movement thereof.

Another object of the present invention is to provide swivel attachments for the first hook and the second hook.

Yet another object of the present invention is to provide for a pair of contact points to be located on the inner surface of the outer member to restrict full removal of the inner member from the outer member. To accomplish this, the inner member first end has a pair of stop blocks that will contact the contact points.

Yet still another object of the present invention is to provide such an outer member that has a cross-sectional "U"-shaped, thereby enabling the inner member to pass through the passageway. The first and second extensions, the first and second handles, the first and second gears, the first and second rack gears, and the first and second locking mechanisms operate in a similar fashion as previously described with the preferred embodiment. In this embodiment, the outer member has a pair of second hooks located opposite the first hook of the inner member.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

Figure 1:
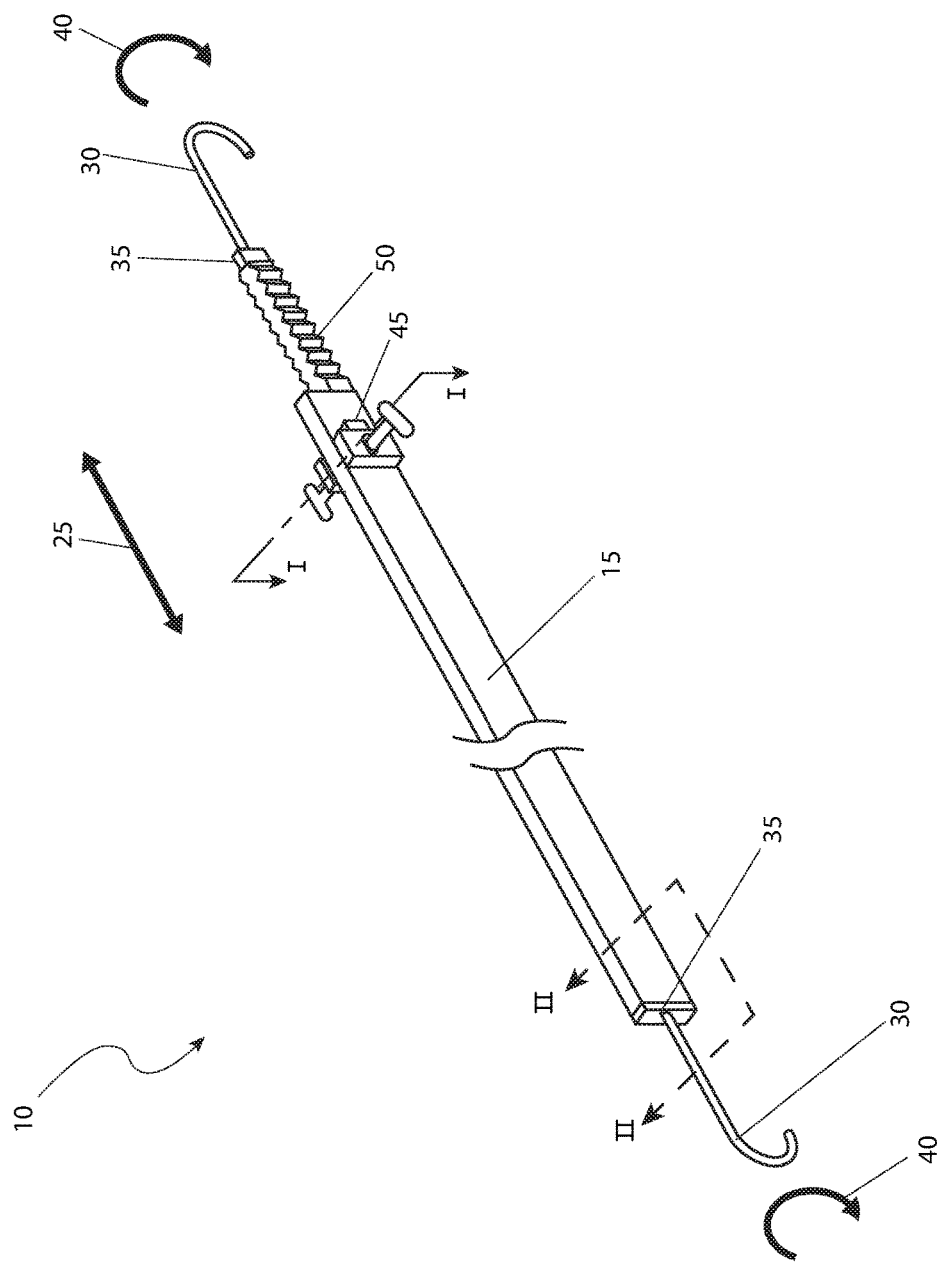
FIG. 1 is a perspective view of the cargo tie-down apparatus 10, according to a preferred embodiment of the invention.

DESCRIPTIVE KEY 10 cargo tie-down
15 outer member
20 inner member
25 first travel path
30 attachment hooks
35 swivel joint
40 second travel path
45 locking mechanism
50 dual linear rack gear 55 activation handle
60 gear
65 pivot pin
70 third travel path
75 key lock device
80 plunger
85 stop block
90 contact point
95 interior flange
100 inner face
105 inner bushing surface
110 securing block body
115 load
120 transport vehicle
125 lifting lug
130 tie-down point
200 alternate embodiment
211 first body
212 first member hook
215a first rack gear
215b second rack gear
220 second body
221 second member first hook
222 second member second hook
223a first extension
223b second extension
224 passageway
225a first handle
225b second handle
227a first key lock
227b second key lock

DETAILED DESCRIPTION OF THE PREFERRED EMBODIMENT

The present apparatus 10 advantageously fills the aforementioned deficiencies by providing a quick and effective means of restraining cargo. The present invention is superior to other systems in that it effectively tightly secures cargo tightly upon or within a truck, trailer, ship, train or plane by the use of a mechanical leverage.

Referring now to FIG. 1, a perspective view of the cargo tie-down apparatus 10, (herein referred to as an "apparatus" 10), according to a preferred embodiment of the invention is disclosed. The cargo tie down 10 provides for an outer member 15 and an inner member 20. The inner member 20 slides in an out of the outer member 15 as shown by a first travel path 25. Both the outer member 15 and the inner member 20 are approximately the same overall length and are generally rectangular in cross-section. Thus, when the inner member 20 is completely inserted into the outer member 15, the overall length of the apparatus 10 is given as "X". When the inner member 20 is nearly fully extended from the outer member 15, the overall length of the apparatus 10 is given as approximately "2X". It is envisioned that the overall length of the apparatus 10 will vary per individual needs, thus different models of the apparatus 10 would be developed. Size ranges of "X-2X" are envisioned to cover from eight to sixteen inches (8-16 in.) and up six to twelve feet (6-12 ft.).

As such, positive securement of loads can be obtained through any "X-2X" range.

Both the distal and proximal ends of the apparatus 10 are provided with attachment hooks 30 of a general "J" shape. It is appreciated that the inner member 20 has one (1) attachment hook 30 and the outer member 15 has one (1) attachment hook 30 in the illustrated embodiment, although either the inner member 20 or outer member 15 may have multiple hooks 30 or no hook 30 at all, and is therefore not a limiting factor of the present disclosure. Each attachment hook 30 is connected to the apparatus 10 by a swivel joint 35 which allows motion along a second travel path 40 as shown. This motion allows for connection of loads to fixed points, such as axles, tie-down points, ropes, grommets, lifting lugs, and the like without regard to their relative orientation to one (1) another. The motion afforded by the swivel joint 35 allows for secure restriction of the load that does not vary over time and motion. Further detail on the swivel joint 35 will be provided herein below. Fastening between the outer member 15 and the inner member 20 is provided by a locking mechanism 45 working in conjunction with a dual linear rack gear 50 that is permanently affixed to both opposing side surfaces of the inner member 20. Further detail on the locking mechanism 45 will be provided herein below.

Figure 2:
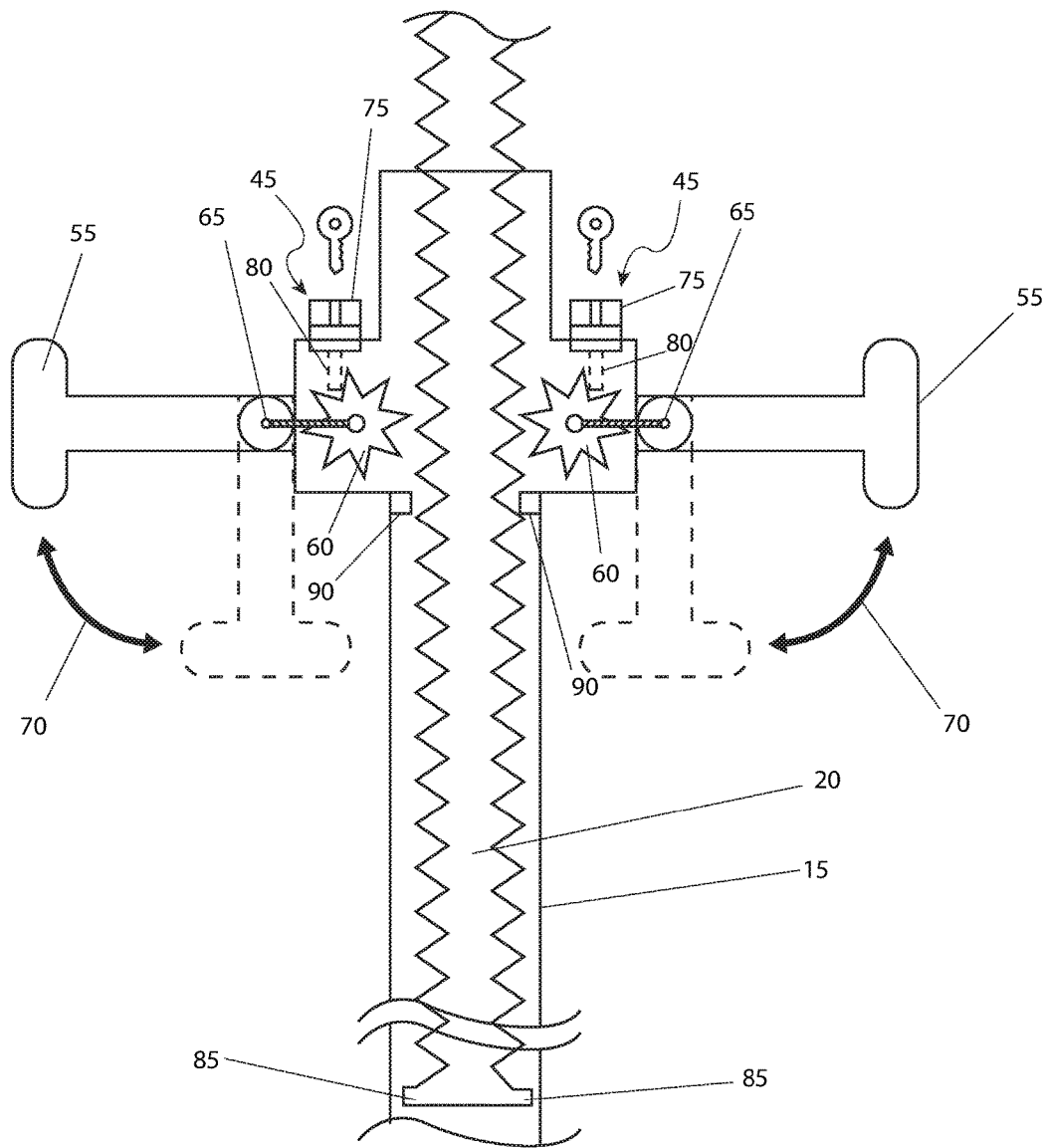
FIG. 2 is a section view of the cargo tie down 10 as seen along a line I-I, as shown in FIG. 1, according to the preferred embodiment of the present invention.

Referring next to FIG. 2, a section view of the cargo tie down 10 as seen along a line I-I, as shown in FIG. 1, according to the preferred embodiment of the present invention is depicted. The inner member 20 is captured by the outer member 15 as aforementioned described. The locking mechanism 45 provides for two (2) activation handles 55 with a gear 60 at each distal end encased within the locking mechanism 45. The activation handles 55 pivots around a respective pivot pin 65 as defined by a third travel path 70. As such, when the activation handle 55 is in an outward position (as shown by solid lines), the inner member 20 is free to move along the first travel path 25 (as shown in FIG. 1). When the activation handle 55 is in an inward position (as shown by dashed lines), the inner member 20 is captured and movement is prohibited.

The locking mechanism 45 also provides for two (2) key lock devices 75 which engages a respective plunger 80 against the gear 60 when the respective activation handle 55 is in an inward position. The deployment of the plunger 80 ensures that the gear 60 remains engaged, thus preventing movement of the activation handle 55 along the third travel path 70. This action ensures that accidental, unintentional, or even malicious or unwanted disengagement of the apparatus 10 cannot occur Finally, two (2) stop blocks 85 are provided at the interior end of the inner member 20 aligned with the dual linear rack gear 50. During instances of maximum extension, each stop block 85 engages a respective contact point 90 (total of two (2)) physically attached to the outer member 15 gear. This action prevents removal of the inner member 20 from the outer member 15 thus ensuring safety of the operator and those adjacent to the work area.

Figure 3:
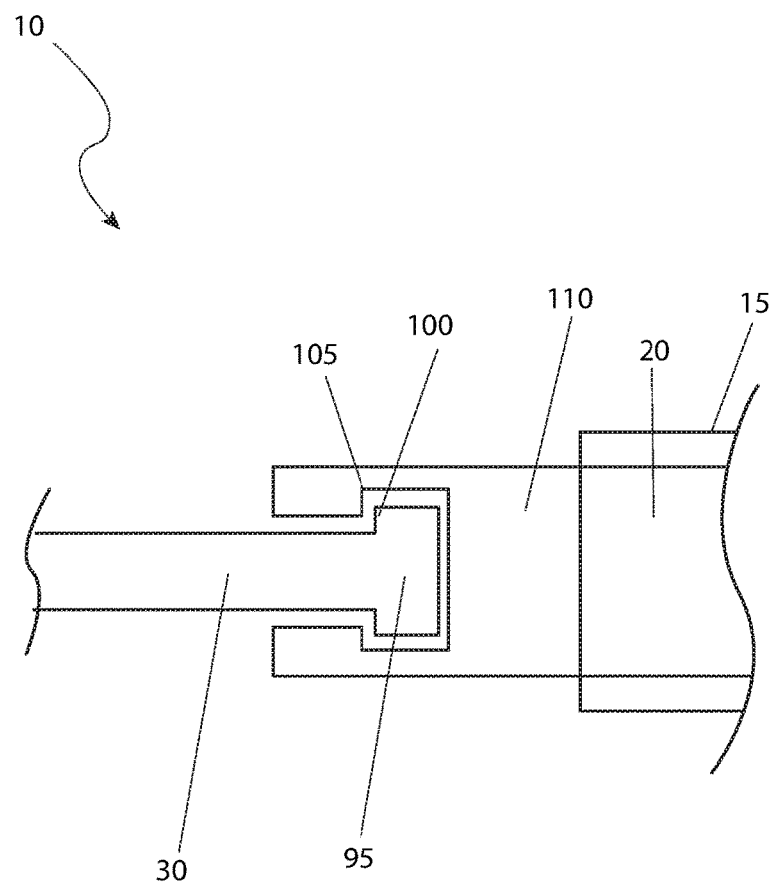
FIG. 3 is a section view of the cargo tie down 10 as seen along a line II-II, as shown in FIG. 1, according to the preferred embodiment of the present invention.

Referring now to FIG. 3, a section view of the cargo tie down 10 as seen along a line II-II, as shown in FIG. 1, according to the preferred embodiment of the present invention is shown. This disclosure provides the mechanism and means by which the three hundred sixty degree(360° travel path is accomplished as shown in FIG. 1. The attachment hooks 30 (at either end of the apparatus 10) terminates in an interior flange 95 that is circular in nature. It is held captive along an inner face 100 by an inner bushing surface 105 on a securing block body 110, all of which are circular in nature and allow for three hundred sixty degrees)(360° of motion. The restricted motion is depicted by flat bearing surfaces, perhaps periodically lubricated with oil. However, other types of bearing surfaces, such as ball bearings, roller bearings, magnetic bearings, and the like may also be utilized, and as such, the particular inclusion or exclusion of any particular type of bearing surface is not intended to be a limiting factor of the present invention.

Figure 4:
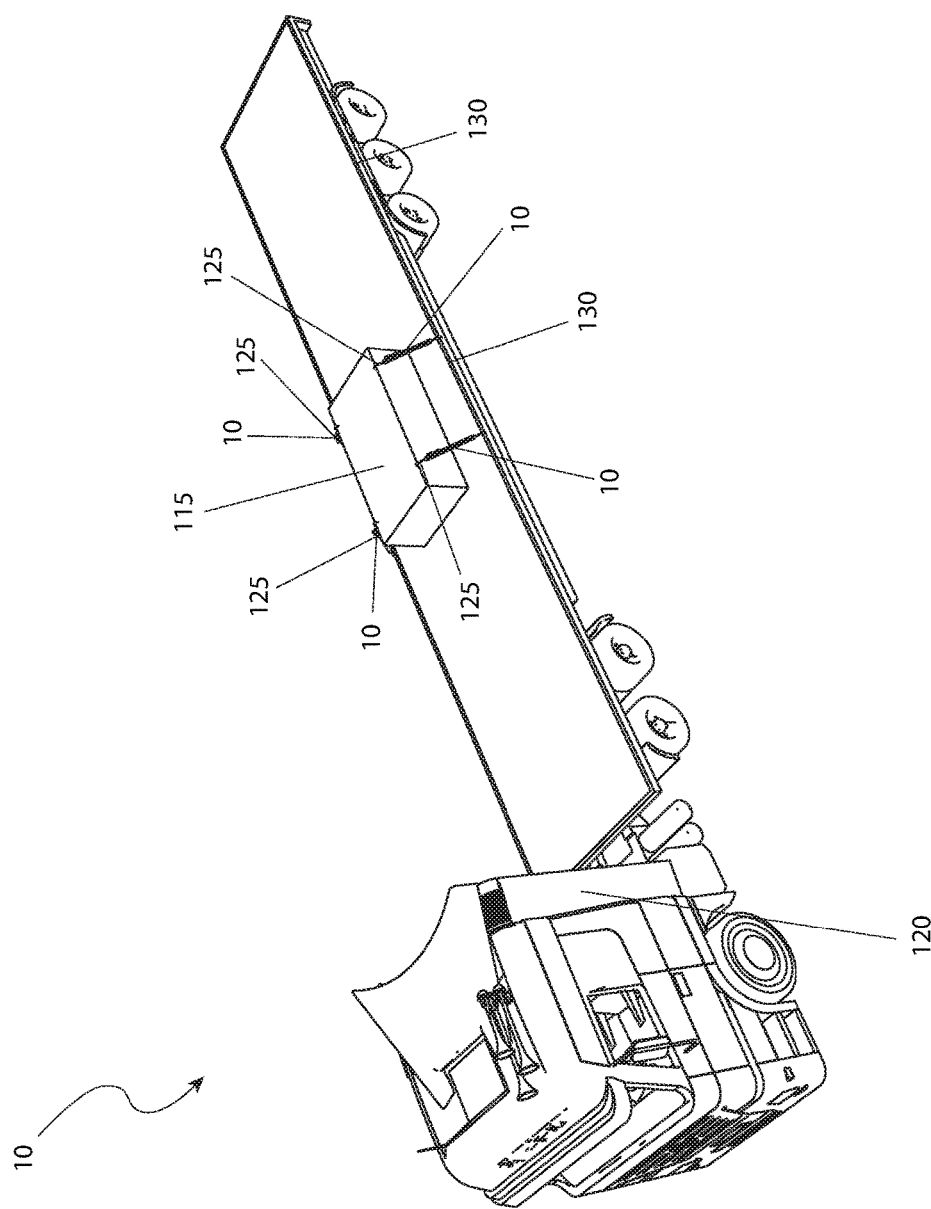
FIG. 4 is a perspective view of the cargo tie down 10, shown in a utilized state, according to the preferred embodiment of the present invention; and, FIG. 5 is a perspective view of the cargo tie down 200, according to an alternate embodiment of the present invention.

Referring to FIG. 4, a perspective view of the cargo tie down 10, shown in a utilized state, according to the preferred embodiment of the present invention is disclosed. A load 115 is placed upon a transport vehicle 120, herein depicted as a flatbed truck. Other types of transport vehicle 120 including but not limited to tractor trailer rigs, trailers, planes, ships, trains, tractors, off-road vehicles, and the like may utilize the apparatus 10 with equal effectiveness. The load 115 is secured with four (4) apparatus 10 as shown which connect from lifting lugs 125 on the load 115 to tie-down points 130 on the transport vehicle 120. It is readily realized by those skilled in the art that the apparatus 10 can provide multiple benefits over other methods of load securement such as ropes, elastic straps, tarps, ratcheting straps and the like with the added benefit of resistance in both compression and extension states. Other types of load 115, including but not limited to: drums, loose items, household items, nets, cargo containers and the like could also be utilized with equal effectiveness.

Figure 5:
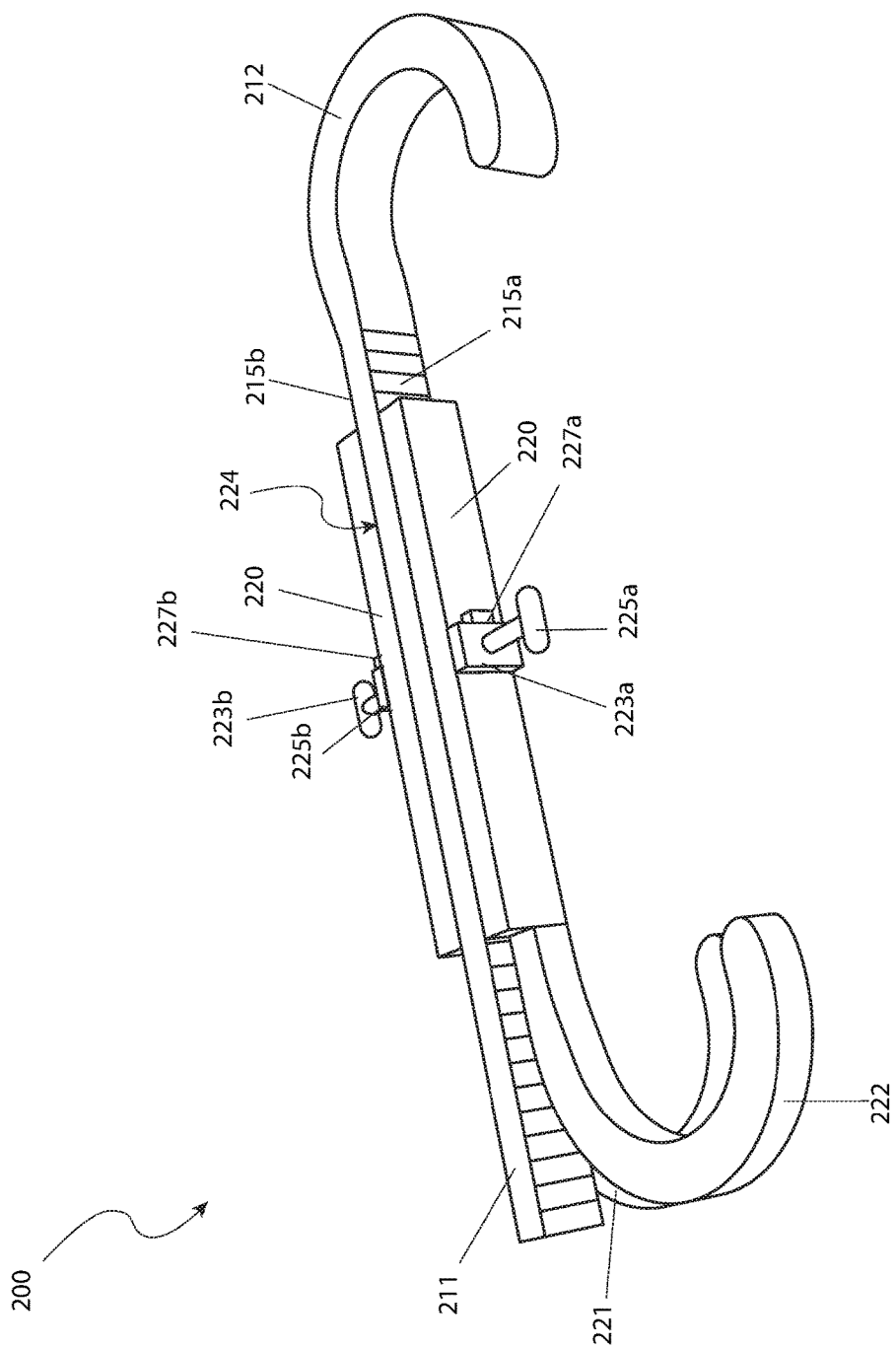

FIG. 5 depicts an alternate embodiment 200 of the cargo tie-down hook 10. Embodiments may include a high strength metal alloy or composite elongated hollow first member 211 having a tubular, square or rectangular cross-section with at least one (1) first member hook 212 fixedly attached at a first end and a first rack gear 215a running a majority of the length of a first side thereof and a second rack gear 215b running along a majority of the length of a second side thereof. A second member 220 is generally shaped as a "U"-shaped body, defining a first end, a second end, and a passageway 224. The second member 220 has a second member first hook 221 and a second member second hook 222 located at the first end of each of the parallel members of the "U"-shaped body. The passageway 224 is sized to enable the rack gear 215 of the first member 210 to traverse throughout. The first member hook 212 and pair of second member hooks 221, 222 are generally "J"-shaped, similar as the previously described and illustrated attachment hooks 30.

The second member 220 includes a first extension 223a on a first side of a first parallel member of the "U"-shaped body and a second extension 223b on a second side of a second parallel member of the "U"-shaped body, preferably directly opposing each other. Each of the extensions 223a, 223b has a gasket exposed on an exterior sidewall thereof and an opening in the sidewall slightly smaller or equal in length to the base of said gusset for the passage of a cam lock or pinion gear (similar as shown in FIG. 2) to interact with the rack gears 215a, 215b. A first handle 225a extends away from the first extension 223a and has a first key lock 227a to provide authorized access to operating the first handle 225a. Similarly, a second handle 225b extends away from the second extension 223b and has a second key lock 227b to provide authorized access to operating the second handle 225b. Both the first handle 225a and second handle 225b are in operable communication with the cam lock or pinion gear. The key locks 227a, 227b interact with a locking mechanism 45 and are similar to that described and illustrated in FIG. 2. The respective cam lock or pinion gear, when actuated by the respective handle 225a, 225b, interacts with the respective rack gear 215a, 215b and motions the first member 211 within the passageway 224 relative to the second member 220 in either linear direction. A key can lock a respective handle 225a, 225b via a respective key lock 227a, 227b, and thus the cam lock or pinion gear, at any desired position on the respective rack gear 215a, 215b to fix the first member 211 in place relative to the second member 220.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated.

What is claimed is:

1. A cargo tie-down tool, comprising:
an outer member, having a first outer end and a second outer end;
an inner member, having a first inner end and a second inner end, said inner member slidably disposed within said outer member;
a first hook attached to said first outer end;
a second hook attached to said second inner end;
a first rack gear, affixed to a first outer side surface of said inner member and coextensive with a majority thereof;
a second rack gear, affixed to a second outer side surface of said inner member and coextensive with a majority thereof;
a first extension located on a first side of said outer member;
a second extension located on a second side of said outer member;
a first activation handle passing through said first extension, having a first end with a first gear located at a distal end thereof and residing within said outer member such that it is in operable communication with said first rack gear;
a first locking mechanism in operable communication with said first gear;
a second activation handle passing through said second extension, having a first end with a second gear located at a distal end thereof and residing within said outer member such that it is in operable communication with said second rack gear;
a second locking mechanism in operable communication with said second gear.

2. The tool of claim 1, wherein said outer member and said inner member each have a rectangular cross-section.

3. The tool of claim 1, wherein:
said first hook is swivelly attached to said first outer end; and,
said second hook is swivelly attached to said second inner end.

4. The tool of claim 3, wherein said first hook and said second hook are generally J-shaped.

5. The tool of claim 1, wherein:
said first activation handle comprises a first pivot pin located adjacent said first extension; and,
said second activation handle comprises a second pivot pin located adjacent said second extension;
wherein when said first activation handle is in an outward position perpendicular to said outer member, said first gear and said first rack gear freely interact,
wherein when said first activation handle is in an inward position parallel to said outer member, said first gear and said first rack gear are restricted from movement;
wherein when said second activation handle is in an outward position perpendicular to said outer member, said second gear and said second rack gear freely interact, and, wherein when said second activation handle is in an inward position parallel to said outer member, said second gear and second rack gear are restricted from movement.

6. The tool of claim 5, wherein:
said first locking mechanism comprises:
   a first key lock device disposed on a side surface of said first extension; and,
   a first plunger residing within said outer member and operably controlled by said first key lock device; and,
said second locking mechanism comprises:
   a second key lock device disposed on a side surface of said second extension; and,
   a second plunger residing within said outer member and operably controlled by said second key lock device;
wherein said first plunger is selectively motioned to abut said first gear; and,
wherein said second plunger is selectively motioned to abut said second gear.

7. The tool of claim 1, further comprising:
a pair of contact points, each located at opposing inner surfaces of said outer member; and,
a pair of stop blocks, each located at opposing sides of said first inner end.

8. The tool of claim 7, wherein said pair of contact points are located directly adjacent said first extension and said second extension.

9. The tool of claim 1, wherein said first extension and said second extension are coaligned with each other.

10. The tool of claim 9, wherein said first extension and said second extension are each located adjacent said second outer end.

11. The tool of claim 10, wherein said first handle is located at a center position on said first extension.

12. The tool of claim 10, wherein said second handle is located at a center position on said second extension.

13. The tool of claim 11, wherein said second handle is located at a center position on said second extension.

14. A tie-down tool, comprising:
a first member, having a first rack gear along a portion of a first side, a second rack gear along a portion of a second side, and a first hook located at a first end thereof;
a second member, having a pair of second hooks located at a bottom side of a first end, a pair of parallel members defining a passageway longitudinally extending from said first end of said second member to a second end, said passageway sized to enable said first rack gear and said second rack gear of said first member to traverse therethrough;
a first extension located on a first one of said pair of parallel members;
a second extension located on a second one of said pair of parallel members;
a first handle passing through said first extension, having a first gear located on a first end thereof, residing within said passageway, and in operable communication with said first rack gear, said first handle having a first actuator located on a second end thereof, said first actuator external from said first extension;
a first locking mechanism comprising:
   a first key lock device disposed on a side surface of said first extension; and,
   a first plunger residing within said first member and operably controlled by said first key lock device;
a second handle passing through said second extension, having a second gear located on a first end thereof, residing within said passageway, and in operable communication with said second rack gear, said second handle having a second actuator located on a second end thereof, said second actuator external from said second extension; and,
a second locking mechanism comprising:
   a second key lock device disposed on a side surface of said second extension; and,
   a second plunger residing within said first member and operably controlled by said second key lock device;
wherein said first plunger is selectively motioned to abut said first gear; and,
wherein said second plunger is selectively motioned to abut said second gear.

15. The tool of claim 14, wherein said first extension and said second extension are coaligned with each other.

16. The tool of claim 15, wherein said first extension and said second extension are each located at a center position along a respective one of said pair of parallel members.

17. The tool of claim 16, wherein said first handle is located at a center position on said first extension.

18. The tool of claim 16, wherein said second handle is located at a center position on said second extension.

19. The tool of claim 17, wherein said second handle is located at a center position on said second extension.

20. The tool of claim 15, wherein each said first hook and said pair of second hooks are generally J-shaped.

* * * * *